US011851559B2

(12) United States Patent
Kim et al.

(10) Patent No.: US 11,851,559 B2
(45) Date of Patent: Dec. 26, 2023

(54) BCDA-BASED SEMI-ALICYCLIC HOMO- OR CO-POLYIMIDE MEMBRANE MATERIALS FOR GAS SEPARATION AND THE PREPARATION METHOD THEREOF

(71) Applicant: KOREA RESEARCH INSTITUTE OF CHEMICAL TECHNOLOGY, Daejeon (KR)

(72) Inventors: Jeong Hoon Kim, Daejeon (KR); Bong Jun Chang, Daejeon (KR); Simon MoonGeun Jung, Daejeon (KR); Su Young Moon, Daejeon (KR); Chae Young Park, Daejeon (KR); Hoon moh Seong, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 977 days.

(21) Appl. No.: 16/689,651

(22) Filed: Nov. 20, 2019

(65) Prior Publication Data
US 2020/0199348 A1 Jun. 25, 2020

(30) Foreign Application Priority Data
Nov. 30, 2018 (KR) .................. 10-2018-0152493

(51) Int. Cl.
C08L 33/24 (2006.01)
C08F 22/40 (2006.01)
B01D 71/64 (2006.01)
(52) U.S. Cl.
CPC .............. *C08L 33/24* (2013.01); *B01D 71/64* (2013.01); *C08F 22/40* (2013.01);
(Continued)

(58) Field of Classification Search
CPC ......... C08L 33/24; C08F 22/40; B01D 71/64; B01D 2256/245; B01D 2257/104; B01D 2257/504; B01D 2257/108
See application file for complete search history.

(56) References Cited

U.S. PATENT DOCUMENTS 4,717,393 A   1/1988  Hayes
4,851,505 A   7/1989  Hayes
(Continued)

FOREIGN PATENT DOCUMENTS

KR   10-2002-0016370 A   3/2002
KR   10-2017-0073977 A   6/2017

OTHER PUBLICATIONS

Bas et al. (Microstructural parameters controlling gas permeability and permselectivity in polyimide membranes, 2010, Journal of Membrane Science, vol. 349, pp. 25-34) (Year: 2010).*
(Continued)

*Primary Examiner* — Youngsul Jeong
(74) *Attorney, Agent, or Firm* — Fredrikson & Byron, P.A.

(57) ABSTRACT

The present invention relates to a BCDA-based semi-alicyclic homo- or co-polyimide membrane material for gas separation and a preparation method thereof. The polyimide material prepared according to the present invention has high solubility in casting solvents, particularly in polar organic solvents, by interrupting asymmetry in the polyimide chain structure and formation of polyimide complexes compared with aromatic polyimides, and has higher heat resistance than the conventional aromatic polyimides and aliphatic polyimides, so that it is useful for the process of a high-selective permeable composite membrane or a asymmetric hollow fiber membrane used for commercial purposes, suggesting that it can be effectively used as a membrane for gas separation in various fields. In addition, the
(Continued)

polyimide material membrane for gas separation of the present invention is useful because it has superior gas separation properties to the conventional commercialized aromatic polyimides or semi-alicyclic polyimides.

10 Claims, 2 Drawing Sheets

(52) U.S. Cl.
CPC .. *B01D 2256/245* (2013.01); *B01D 2257/104* (2013.01); *B01D 2257/108* (2013.01); *B01D 2257/504* (2013.01)

(56) References Cited

U.S. PATENT DOCUMENTS

| | | |
|---|---|---|
| 4,880,442 A | 11/1989 | Hayes |
| 4,912,197 A | 3/1990 | Hayes |
| 5,938,819 A * | 8/1999 | Seery .................. B01D 53/053 95/902 |
| 9,511,320 B2 | 12/2016 | Kim et al. |
| 2009/0227744 A1 | 9/2009 | Ekiner et al. |

OTHER PUBLICATIONS

Sroog et al. (Aromatic polypyromellitimides from aromatic polyamic acids, 1965, Journal of Polymer Science: Part A, vol. 3, pp. 1373-1390) (Year: 1965).*

Ding et al. (Polyimide Membranes Derived from Poly(amic acid) Salt Precursor Polymers. 1. Synthesis and Characterization, 2002, Macromolecules, vol. 35, pp. 905-911) (Year: 2002).*

Bas, Corine et al., "Copolyimides Containing Alicyclic and Fluorinated Groups: Solubility and Gas Separation Properties", Journal of Polymer Science: Part B: Polymer Physics, Wiley Periodicals, Inc., vol. 43, pp. 2413-2426 (2005).

Bas, Corine et al., "Microstructural parameters controlling gas permeability and permselectivity in polyimide membranes", Journal of Membrane Science, 349, pp. 25-34 (2010).

\* cited by examiner

[Fig. 1A]
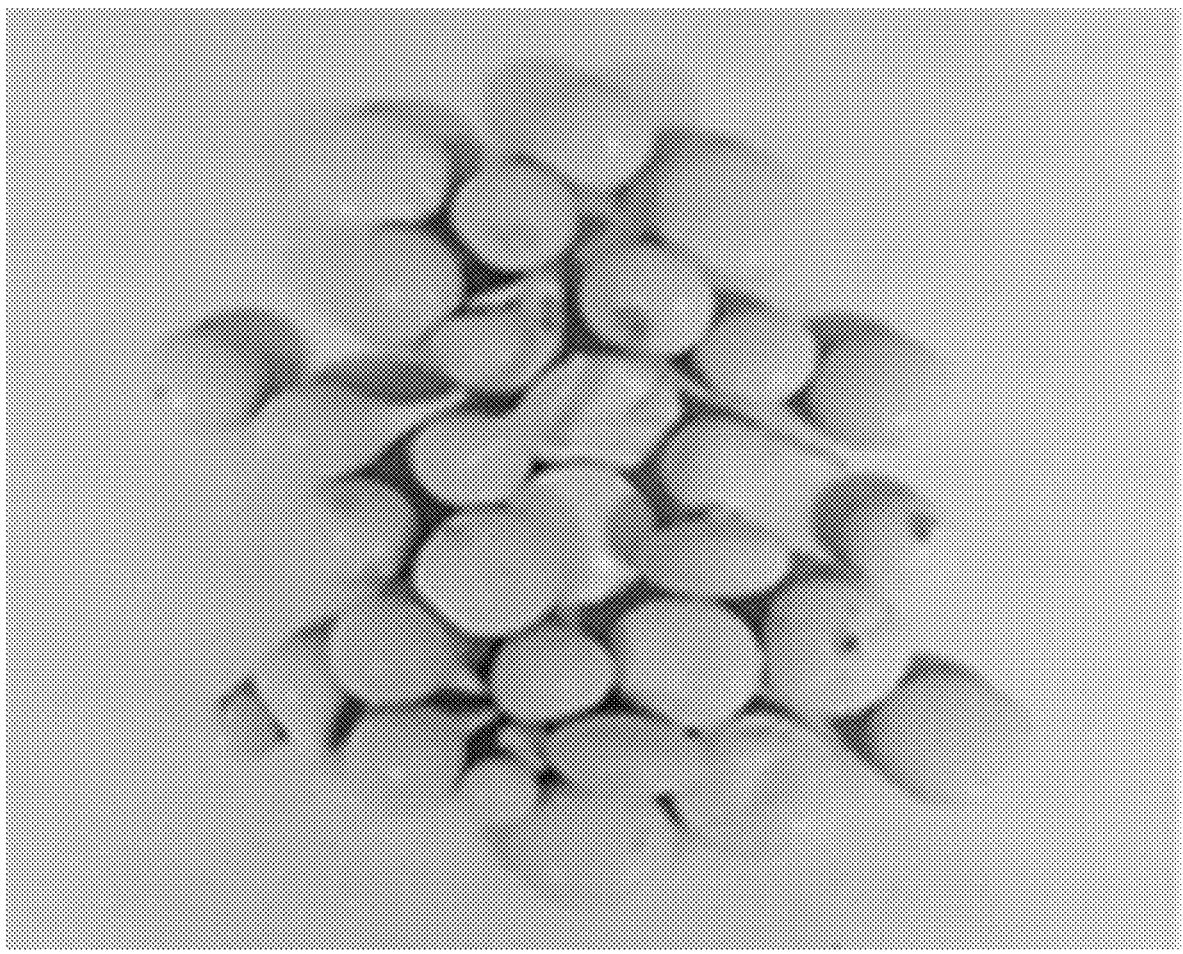

[Fig. 1B]
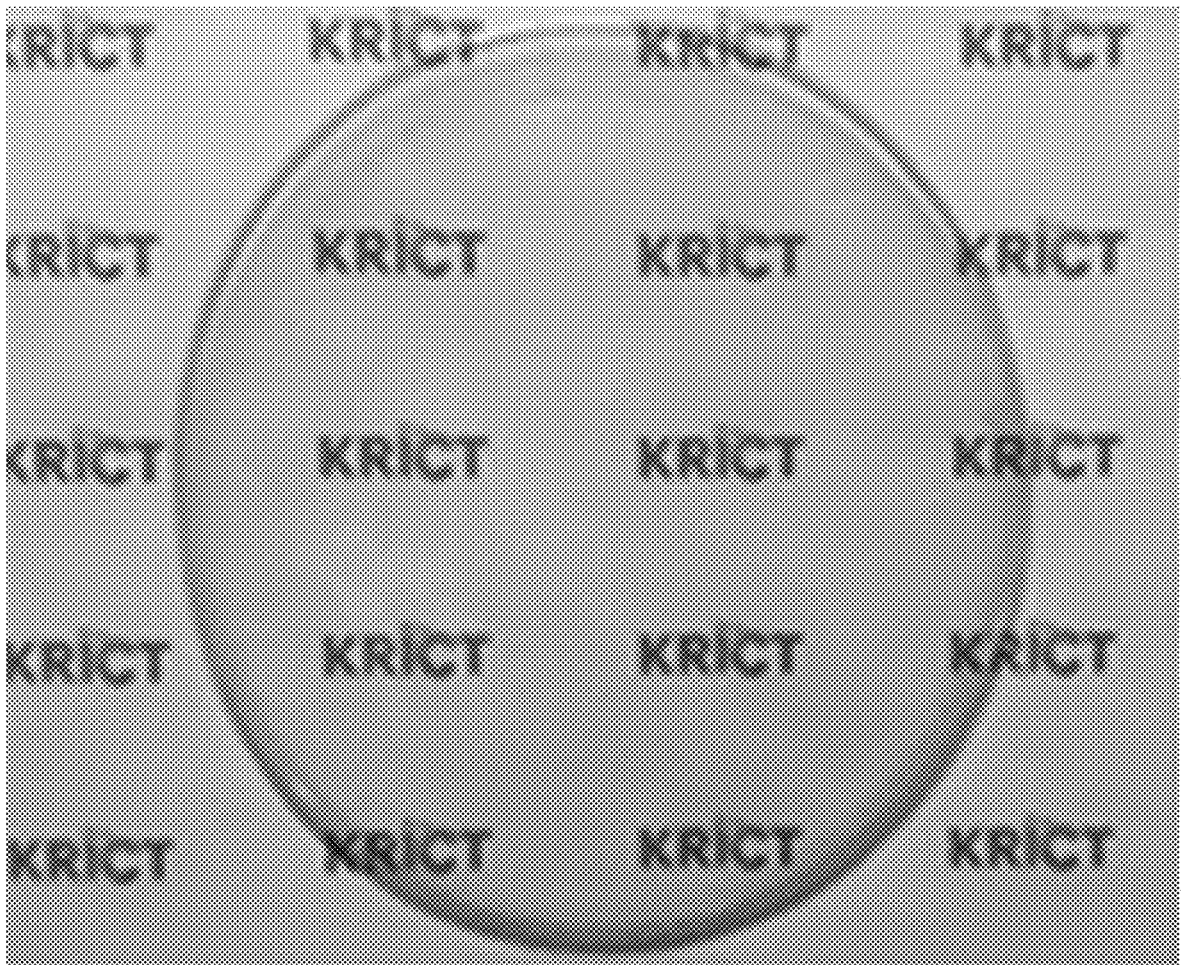

BCDA-BASED SEMI-ALICYCLIC HOMO- OR CO-POLYIMIDE MEMBRANE MATERIALS FOR GAS SEPARATION AND THE PREPARATION METHOD THEREOF

CROSS-REFERENCE TO RELATED APPLICATION

This application claims priority to Korean Patent Application Serial No. 10-2018-0152493, filed on Nov. 30, 2018, the entire content of which is hereby incorporated herein by reference in its entirety for all purposes.

FIELD OF THE INVENTION

The present invention relates to a BCDA-based semi-alicyclic homo- or co-polyimide membrane material for gas separation and a preparation method thereof. More particularly, the present invention relates to a noble semi-alicyclic homo- or co-polyimide membrane for gas separation characterized by high gas permeability and high gas separation selectivity, excellent heat resistance, chemical resistance and mechanical properties, and easiness in process for a composite membrane or an asymmetric membrane due to solubility in a polar organic solvent, and a preparation method thereof.

BACKGROUND OF THE INVENTION

The gas separation process most commonly used for high purity purification of various gas mixtures generated in various industrial sites including chemistry, power generation, steel, natural gas and biogas related industries is exemplified by energy intensive distillation, extraction, evaporation, absorption, adsorption, cryogenics and crystallization. About 40% of total energy consumption in the industry is spent in the separation process.

In the case of membrane separation process, it is known that the separation process does not accompany phase change in general, so that the separation process consumes less energy; is pro-environmental; requires simple devices and accordingly uses smaller space; and is easy to operate, manage and maintain. In addition, it has the advantage of easy scale-up and has the advantage of easy application in a hybrid form that is easily combined with other separation processes. Therefore, studies and development of such separation process have been tried by many researchers in order to replace the conventional energy intensive processes. As an alternative, the membrane separation process using a membrane has been on the spot light.

In the 1960s, studies on gas separation membranes began to progress, and a preparation method of asymmetric reverse osmosis membrane developed by Loeb and Sourirajan began to be applied to gas separation in 1970s, which accelerated the advancement. In particular, Monsanto Co. tried to use a hollow fiber membrane in the process of separation/recovery of hydrogen generated in refinery process for the first time in early 1977. Based on the successful results, the hollow fiber membrane became commercialized under the brand name of PRISM® in 1979, and thus Monsanto Co. now sells 75 membrane separation systems world-widely.

In addition to PRISM® provided by Monsanto, the spiral CA module of Separex, USA was successfully applied to recover $H_2$ from the waste gas generated from refinery and petrochemical processes, to control $H_2$ composition in ammonia plants, and methanol plants. Thereafter, it has been tried to enlarge the application of the membrane not only in $H_2$ separation but also in $CO_2$ separation. Natural gas collected in oilfield is generally composed of 40~45 mol % $CO_2$ and 54~59 mol % $CH_4$. The membrane separation process was successfully applied for the separation of $CO_2/CH_4$.

Since then, studies on separation membrane materials and membrane separation processes have been undergoing and many of the results led to commercialization, and thus many companies have emerged and are growing with pioneering various applicable fields. So, the membrane separation process settled as a competitive process to replace the conventional cryogenics, absorption or adsorption.

The most widely used gas separation is the process of separating high purity $N_2$ from air or $H_2$ from a mixture of $N_2$, $CH_4$ and $CO_2$, and purifying $CH_4$ by removing $CO_2$ from biogas or natural gas. Due to these advantages, the market size of gas separation membranes in advanced counties including USA and Japan is as big as $1 billion as of 2018 and is increasing by more than 10% per year as of today. The application of gas separation membranes is expected to expand to the size of trillion won in 2030s.

The separation membrane material used for membrane separation process is very diverse. To construct various types of separation membranes prepared from such a variety of materials into modules and apply them to actual separation processes after systemizing the modules, research and development in various fields must be conducted from the development of separation membrane materials to the design and optimization of module production systems. It is very important to select a separation membrane material that has high permeability and selectivity suitable for the field of application and to prepare a separation membrane which is a key factor in the process of membrane separation using the same.

The membrane material used in most gas separation processes is generally composed of nonporous glassy polymer membranes. The gas permeation characteristics of the glassy polymer membrane are affected not only by the intermolecular space, stiffness and crystalline structural properties of the membrane material, the shape of the membrane and the properties of the permeable gas but also by the interaction between polymer and gas. Therefore, it is very important to select a membrane material suitable for the process to be applied. To apply a polymer-based separation membrane commercially in the industry, the membrane has to have high gas permeability and high selectivity and at the same time needs to have excellent thermal and mechanical stability to withstand pressure and temperature along with chemical properties to stand gases to be treated when processed as a thin film. It also needs solubility in organic solvents wherein phase-change process can be applied when the material is mass-produced in the form of a separation membrane.

Thousands of polymer materials having various chemical structures have been studied and developed as a separation membrane material so far, but only 8-9 kinds of them have been commercialized and used in consideration of the material price, mass-productivity and performance, etc.

The most widely applied organic polymer materials as a membrane material for gas separation are polysulfone, polyimide, cellulose acetate, polycarbonate, polypyrrolone and polyarylate, etc. Among the various polymer materials applicable for gas separation, polyimide membranes having particularly high chemical and thermal stability have been studied due to their high separation characteristics and high permeability characteristics, compared with the conventional polymer membrane materials. In particular, various efforts have been made to give high perm-selectivity. For example, U.S. Pat. No. 4,880,442 describes a polyimide membrane with improved permeability and high free volume on polymer chain which had been given by using non-rigid anhydrides.

U.S. Pat. Nos. 4,851,505 and 4,912,197 describe a polyimide membrane for gas separation with high selectivity, productivity and mechanical stability, favoring polymer process, by using annealed polyimide polymer having a certain repeat unit, characterized by excellent solubility in general solvents. US Patent No US 2009-0227744 describes a membrane with high selectivity, productivity and mechanical stability through annealed polyimide polymer having a certain repeat unit. U.S. Pat. No. 4,717,393 describes a polyimide membrane with high gas selectivity and high stability, compared with the conventional polyimide membranes for gas separation using a cross-linked polyimide.

Most of the conventional aromatic polyimide polymer membrane materials have excellent permeability and selectivity but have disadvantages of high production price and insolubility in polar organic solvents, suggesting that they are limited in using for the preparation of a composite membrane or a highly permeable membrane having an asymmetric structure. That is, numbers of those wholly aromatic polyimide materials are still limited in use and application due to the problems of solubility in organic solvents, even though their high economical value for the application to gas separation process.

A few fully aromatic polyimide materials having high $CO_2$ and hydrogen gas permeability and high hydrogen/methane, $CO_2/CO$, $CO_2$/methane and hydrogen/nitrogen selectivity and dissolved in organic solvents can be applied as a being proper gas separation membrane for commercial separation and recovery of hydrogen, methane and $CO_2$ are only exemplified by Upilex-based polymer membrane material developed by Ube, Japan, P84-based polymer membrane material developed by Evonic, Germany.

In the recent attempted process of preparing polyimide, when alicyclic dianhydride was used instead of aromatic dianhydride, it was made into an asymmetric membrane or a composite membrane that was able to be dissolved in organic solvents to increase membrane forming processability, which was proposed as an alternative semi-alicyclic polyimide material having satisfactory characteristics with high permeability and high selectivity for certain gases, high mechanical strength with low price.

In U.S. Pat. No. 9,511,320, semi-alicyclic polyimide based on DOCDA (5-(2,5-dioxotetrahydrofuryl)-3-methyl-3-cyclohexene-1,2-dicarboxylic anhydride), one of alicyclic dianhydrides, was used as a membrane material for gas separation in the process of preparing polyimide. According to the patent above, this material can be dissolved in general organic solvents used for membrane formation such as NMP, NMP and THF and displays high gas separation properties for $CO_2$/methane and hydrogen/methane, but is still limited in commercial use because $CO_2$ or hydrogen gas permeability that is a key factor of a membrane for gas separation is as low as several barrers.

J. Polym. Sci. Part B: Polym. Phys. 43 (2005) 2413-2426 and Journal of Membrane Science vol. 349, 25-34, 2010 reported gas separation characteristics of a polyimide membrane material prepared by using BCDA (bicyclo[2,2,2]oct-7-ene-2,3,5,6-tetracarboxylic dianhydride), the alicyclic dianhydride, and ODPA (4,4'-oxydiphthalic dianhydride), the aromatic dianhydride using ODA (4,4'-oxydianinline). When BCDA was used alone, the permeability of hydrogen was as high as 20 barrer and the permeability of nitrogen was as high as 1.35 barrer, but the $H_2/N_2$ selectivity was as low as 14.5 barrer. When BCDA and ODPA copolymer was used, the $H_2$ permeability was dramatically decreased as low as 4.41~4.67 barrer by the affect of the aromatic dianhydride ODPA, indicating that it was not appropriate for commercial use because of low $H_2$ permeability.

In addition, the documents above did not report studies of improving or optimizing permeation characteristics using various aromatic diamines except ODPA, and did not report separation characteristics of other commercially important gases, methane or carbon monoxide.

As confirmed by the present inventors, there have been no attempts to synthesize semi-alicyclic homo- or co-polyimides by changing various aromatic amines using the alicyclic dianhydride BCDA (bicyclo[2,2,2]oct-7-ene-2,3,5,6-tetracarboxylic dianhydride) playing a role in increasing solubility in casting solvents, high gas permeability and separation selectivity by interrupting asymmetry in the polyimide chain structure and formation of polyimide complexes and to optimize thereof as a gas separation membrane or patents or international papers related to the gas separation membrane.

PRIOR ART REFERENCE

Patent Reference (Patent Reference 1) U.S. Pat. No. 4,880,442
(Patent reference 2) U.S. Pat. No. 4,851,505
(Patent Reference 3) U.S. Pat. No. 4,912,197
(Patent Reference 4) US Patent No. 2009-0227744
(Patent Reference 5) U.S. Pat. No. 4,717,393
(Patent Reference 6) U.S. Pat. No. 9,511,320

Non-Patent Reference (Non-Patent Reference 1) J. Polym. Sci. Part B: Polym. Phys. 43 (2005) 2413-2426
(Non-Patent Reference 2) Journal of Membrane Science vol. 349, 25-34, 2010

SUMMARY OF THE INVENTION

It is an object of the present invention to provide a novel BCDA-based semi-alicyclic homo- or co-polyimide membrane material for gas separation which has significantly higher heat resistance than the conventional aromatic polyimides; is well dissolved in organic solvents unlike the aromatic polyimides; has high gas permeability of hydrogen, carbon dioxide and oxygen; and at the same time has superior gas separation properties for hydrogen/methane, carbon dioxide/methane, carbon dioxide/carbon monoxide and oxygen/nitrogen to the conventional commercial aromatic polyimides or semi-alicyclic polyimides.

It is another object of the present invention to provide a preparation method of the novel BCDA-based semi-alicyclic homo- or co-polyimide membrane material for gas separation.

It is also an object of the present invention to provide a membrane for gas separation comprising the novel BCDA-based semi-alicyclic homo- or co-polyimide membrane material for gas separation.

To achieve the above objects, the present invention provides paid close attention to the conventional semi-alicyclic homo- or co-polyimide polymer materials for gas separation. Then, the present inventors studied the gas permeability and selectivity of polymer membranes by using the alicyclic dianhydride BCDA (bicyclo[2,2,2]oct-7-ene-2,3,5, 6-tetracarboxylic dianhydride) that can enhance solubility in casting solvents and gas permeability and selectivity by interrupting asymmetry in the polyimide chain structure and formation of polyimide complexes and simultaneously by changing various microchemical structures of aromatic diamines.

As a result, the present inventors developed a gas separation membrane comprising a novel BCDA-based semi-alicyclic homo- or co-polyimide membrane material for gas separation which had significantly higher heat resistance than the conventional aromatic polyimides; was well dissolved in organic solvents unlike the aromatic polyimides; had high gas permeability of hydrogen, carbon dioxide and oxygen; and at the same time had superior gas separation properties for hydrogen/methane, carbon dioxide/methane, carbon dioxide/carbon monoxide and oxygen/nitrogen to the conventional commercial aromatic polyimides or semi-alicyclic polyimides.

In an aspect of the present invention, the invention provides a polyimide material prepared from a polyamic acid composition comprising:
(a) one or more diamines represented by formula 1 below; and
(b) BCDA (bicyclo[2,2,2]oct-7-ene-2,3,5,6-tetracarboxylic dianhydride):

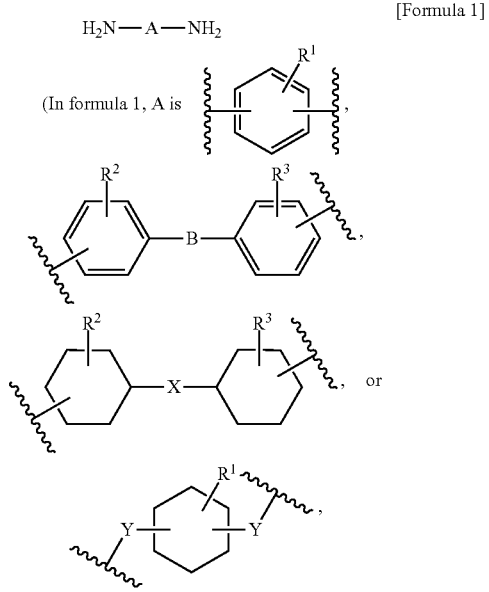

wherein, $R^1$ is 1~4 substituents independently selected from the group consisting of hydrogen and C1-3 straight or branched alkyl, $R^2$ and $R^3$ are 1~4 substituents independently selected from the group consisting of hydrogen and C1-3 straight or branched alkyl, or adjacent $R^2$ and $R^3$ can be linked together to form single bond, B is single bond, C1-3 straight or branched alkylene nonsubstituted or substituted with halogen, C2-4 alkenylene nonsubstituted or substituted with halogen, —S—, —(S=O)—, —(O=S=O)—, —$CR^4R^5$—, or —O—Z—O—, wherein $R^4$ and $R^5$ together form C3-10 cycloalkyl or C5-20 aryl nonsubstituted or substituted with C1-3 straight or branched alkyl or halogen, Z is phenylene or

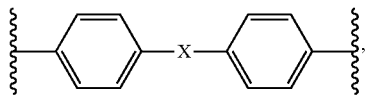

X is single bond or C1-3 straight or branched alkylene nonsubstituted or substituted with halogen, and Y is C1-3 straight or branched alkylene nonsubstituted or substituted with halogen).

In another aspect of the present invention, the invention provides a preparation method of a polyimide material comprising a step of performing imidization of the polyamic acid composition above.

In another aspect of the present invention, the invention provides a gas separation membrane comprising the polyimide material above.

Advantageous Effect

The polyimide material prepared according to the present invention has high solubility in casting solvents, particularly in polar organic solvents, by interrupting asymmetry in the polyimide chain structure and formation of polyimide complexes compared with aromatic polyimides, and has higher heat resistance than the conventional aromatic polyimides and aliphatic polyimides, so that it is useful for the process of a high-selective permeable composite membrane or a asymmetric hollow fiber membrane used for commercial purposes, suggesting that it can be effectively used as a membrane for gas separation in various fields. In addition, the polyimide material membrane for gas separation of the present invention is useful because it has superior gas separation properties to the conventional commercialized aromatic polyimides or semi-alicyclic polyimides.

In particular, the gas separation membrane comprising the polyimide material of the present invention has high gas permeability for hydrogen, carbon dioxide and oxygen, and at the same time, has high gas separation selectivity for hydrogen/methane, carbon dioxide/methane, carbon dioxide/carbon monoxide and oxygen/nitrogen, so that it is advantageous for separating and concentrating such gases as methane, hydrogen, oxygen, nitrogen and carbon dioxide efficiently with high purity. Therefore, the polyimide membrane material for gas separation of the present invention can be effectively used for the efficient gas separation in various fields including not only the industry requiring the separation of carbon dioxide, hydrogen, carbon monoxide and methane generated during the process of methane reforming and the processes of manufacturing by-product gas in steel works, IGCC, bio-gas, natural gas and hydrogen, but also the fields of nitrogen separation, oxygen concentration, vapor dehumidification, carbon dioxide separation and other industrial processes using methane, nitrogen, nitrogen dioxide and carbon monoxide, etc.

BRIEF DESCRIPTION OF THE DRAWINGS

FIGS. 1A and 1B are a set of photographs showing the BCDA-based polyimide particles prepared in the present invention (A) and the formed separation membrane (B).

DESCRIPTION OF THE PREFERRED EMBODIMENTS

Hereinafter, the present invention is described in detail.

However, the following description is only illustrative of the present invention, and the present invention is not limited to the following description.

In an aspect of the present invention, the invention provides a polyimide material prepared from a polyamic acid composition comprising:
(a) one or more diamines represented by formula 1 below; and
(b) BCDA (bicyclo[2,2,2]oct-7-ene-2,3,5,6-tetracarboxylic dianhydride).

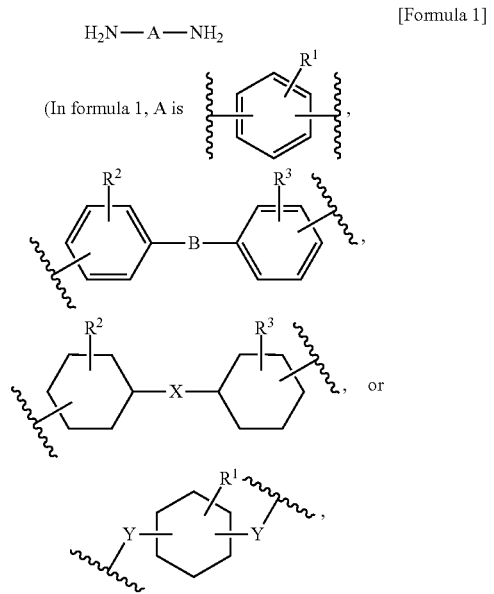

[Formula 1]

wherein, $R^1$ is 1~4 substituents independently selected from the group consisting of hydrogen and C1-3 straight or branched alkyl, $R^2$ and $R^3$ are 1~4 substituents independently selected from the group consisting of hydrogen and C1-3 straight or branched alkyl, or adjacent $R^2$ and $R^3$ can be linked together to form single bond, B is single bond, C1-3 straight or branched alkylene nonsubstituted or substituted with halogen, C2-4 alkenylene nonsubstituted or substituted with halogen, —S—, —(S=O)—, —(O=S=O)—, —CR4R5-, or —O—Z—O—, wherein $R^4$ and $R^5$ together form C3-10 cycloalkyl or C5-20 aryl nonsubstituted or substituted with C1-3 straight or branched alkyl or halogen, Z is phenylene or

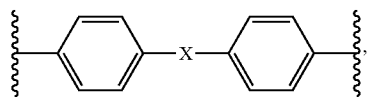

X is single bond or C1-3 straight or branched alkylene nonsubstituted or substituted with halogen, and Y is C1-3 straight or branched alkylene nonsubstituted or substituted with halogen).

In a preferred embodiment of the present invention, the diamine can be one or more compounds selected from the group consisting of the following compounds:

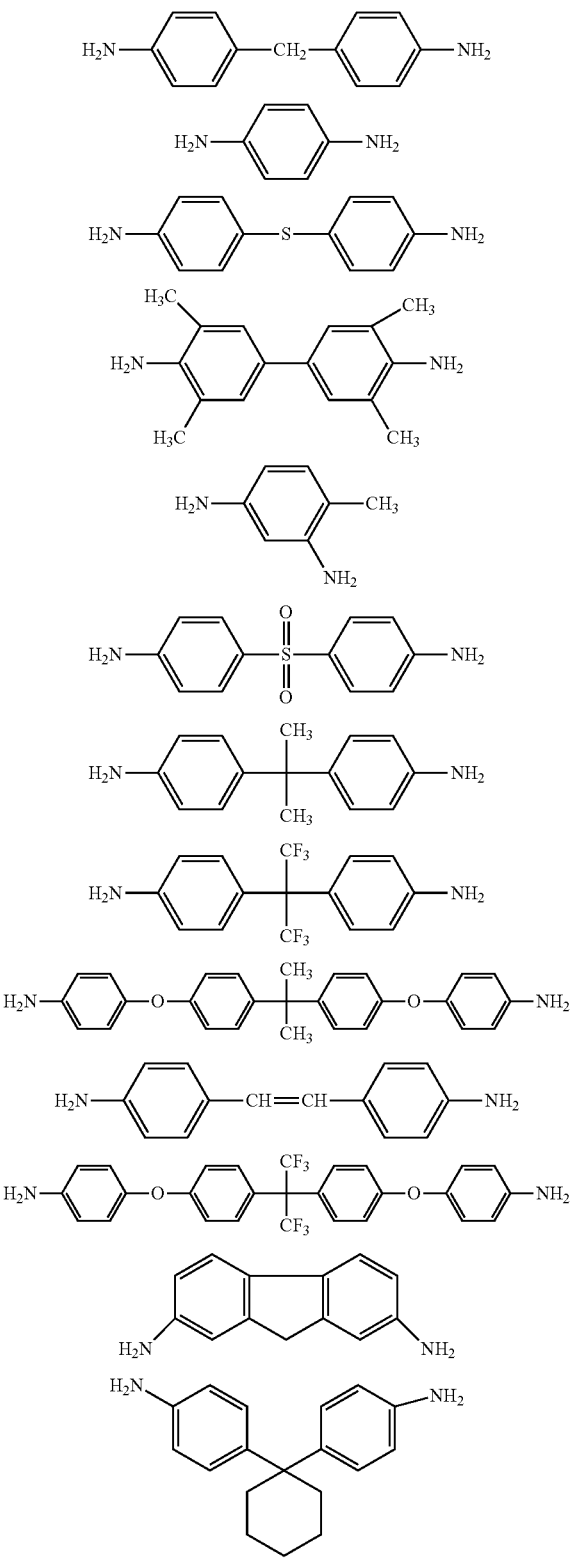

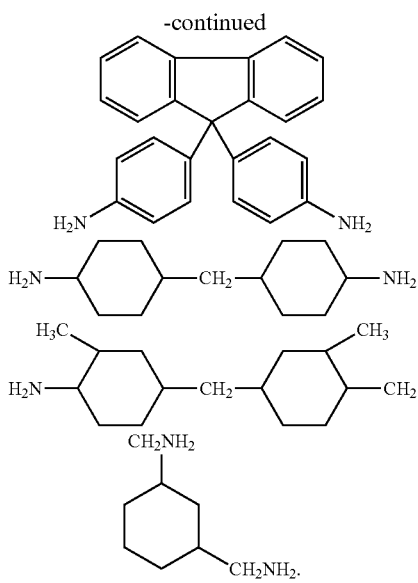

In another preferred embodiment of the present invention, the polyimide material can be the polyimide prepared from a polyamic acid composition comprising:
(a) one or two diamines selected from the group consisting of MDA (4.4'-diaminodiphenyl methane (MDA), 6F-m-DA(3,4'-hexafluoroisopropylidene-dianiline) and m-TDA (2,4-toluenediamine); and
(b) BCDA (bicyclo[2,2,2]oct-7-ene-2,3,5,6-tetracarboxylic dianhydride).

Herein, the amount of diamine (a) and BCDA (b) is not particularly limited. For example, diamine (a) can be used at the similar or equal equivalent mol to BCDA (b). Precisely, the molar ratio of diamine (a) and BCDA (b) can be 0.5-1:0.5-1, or diamine (a) can be used in the range of 50 to 150 mol % by 100 mol % of BCDA (b). Preferably, diamine (a) can be used in the range of 80 to 120 mol % or approximately 100 mol % by 100 mol % of BCDA (b).

On the other hand, when two or more diamines are used, the amount of each diamine is not particularly limited. For example, each diamine can be used in the ratio of 0.01-3.0, 0.05-2.0, or 0.1-1.5 by the molar ratio of the first diamine.

Particularly, the amount of each of the two different diamines is not particularly limited, but it is preferred that the molar ratio of the first diamine to the second diamine can be 0.01-3.0:0.01-3.0, 0.05-2.0:0.05-2.0 or 0.1-1.5:0.1-1.5.

In another preferred embodiment of the present invention, the polyamic acid composition further includes an organic solvent (c).

The organic solvent herein is not particularly limited as long as it can dissolve the diamine (a) and BCDA (b). For example, any organic solvent that is used for organic chemical reactions can be used without limitation. Or, one or more polar solvents selected from the group consisting of m-cresol, N-methyl-2-pyrrolidone (NMP), dimethylformamide (DMF), dimethylacetamide (DMAc), dimethylsulfoxide (DMSO), acetone, diethylacetate and dimethylphthalate (DMP) can be used. In addition, a low boiling point solution such as tetrahydrofuran (THF) and chloroform or a solvent such as γ-butyrolactone can be used.

The content of the solvent above is not particularly limited, but preferably 50-95 weight % and more preferably 70-90 weight % by the total weight of the polyamic acid composition in order to obtain appropriate molecular weight and viscosity of the polyamic acid solution.

The polyamic acid composition provided in the present invention can provide a novel BCDA-based polyimide material from the imidization reaction between the BCDA included in the polyamic acid composition and the diamine represented by formula 1.

Herein, the present invention is not limited to a certain theory. The polyimide material prepared from the polyamic acid composition of the present invention can interrupt asymmetry in the polyimide chain structure and formation of polyimide complexes, and as a result the material displays excellent solubility in casting solvents, compared with aromatic polyimides and the conventional commercial polyimides.

The casting solvent herein can be understood as an organic solvent particularly a polar organic solvent, but not always limited thereto. For example, the casting solvent can be NMP, DMAc, DMF, DMSO, THF, AC, CF, EA, MC or a mixed solvent thereof.

The polyimide material prepared from the polyamic acid composition has excellent heat resistance, which is particularly superior to aliphatic polyimides and aromatic polyimides.

Thus, the polyimide material of the present invention demonstrating the above characteristics can be easily processed as a high-selective permeable composite membrane or an asymmetric hollow fiber membrane used for commercial purposes, indicating that the polyimide material of the present invention can be used for gas separation in various fields.

In addition, the gas separation membrane comprising the polyimide material of the present invention has high gas permeability for hydrogen, carbon dioxide and oxygen, and at the same time, has high gas separation selectivity for hydrogen/methane, carbon dioxide/methane, carbon dioxide/carbon monoxide and oxygen/nitrogen, so that it is advantageous for separating and concentrating such gases as methane, hydrogen, oxygen, nitrogen and carbon dioxide efficiently with high purity.

In another aspect of the present invention, the invention provides a preparation method of a polyimide material comprising a step of performing imidization of the polyamic acid composition above.

In a preferred embodiment of the present invention, the step of performing imidization above can be understood as a step of inducing reaction between diamine (a) and BCDA (b) in an organic solvent (c).

In another preferred embodiment of the present invention, the step of performing imidization is composed of the substeps of i) inducing reaction of the polyamic acid composition at 60-90° C. or 70-80° C. for 1-3 hours or about 2 hours; and ii) inducing further reaction at 180-220° C. or about 200° C. for 15-30 hours or 17-25 hours or about 18 hours.

In another preferred embodiment of the present invention, the step of performing imidization above can be understood as a step of inducing reaction between at least one of diamines represented by formula 1 and BCDA, as shown in reaction formula 1 below.

[Reaction Formula 1]

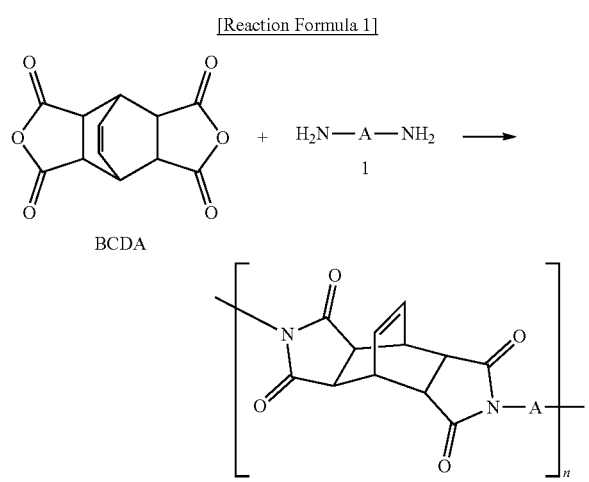

(In reaction formula 1 above, n is not particularly limited, but can be 10 or more, 100 or more, 1000 or more, or 10000 or more).

According to the preparation method of the present invention, the applicable method for imidization is thermal imidization, chemical imidization or combined method of thermal imidization and chemical imidization.

At this time, the thermal imidization method comprises the steps of casting the polyamic acid solution on a support; and heating thereof with raising the temperature from 30° C. to 400° C. gradually for 1~10 hours to obtain a polyimide film.

In addition, the chemical imidization method can comprise the step of adding a dehydrating agent represented by an acid anhydride, such as acetic anhydride, and an imidization catalyst represented by amines such as isoquinoline, β-picolin and pyridine to the polyamic acid solution.

When the chemical imidization method and the thermal imidization method are used in combination, the heating condition of the polyamic acid solution can vary depending on the kind of the polyamic acid solution, the thickness of the polyimide film to be produced, and the like.

For example, a dehydrating agent and an imidization catalyst are added to the polyamic acid solution, which is casted on a supporter, followed by heating at 80~300° C. or preferably 150~250° C. in order to activate the dehydrating agent and the imidization catalyst. By which, the solution is partially hardened and dried, resulting in the preparation of a polyimide membrane.

In another aspect of the present invention, the invention provides a polyimide material produced by the preparation method above.

In a preferred embodiment of the present invention, the polyimide material has the intrinsic viscosity (ηint) of 0.9 to 1.7 dL/g, 1.0 to 1.7 dL/g, 0.9 to 1.5 dL/g 0.9 to 1.3 dL/g or 1.0 to 1.25 dL/g.

In another preferred embodiment of the present invention, the polyimide material is dissolved in casting solvents, for example dissolved in NMP, DMAc, DMF, DMSO, THF, AC, CF, EA, MC or a mixed solvent thereof.

In another aspect of the present invention, the invention provides a gas separation membrane comprising the polyimide material above.

In a preferred embodiment of the present invention, the gas separation membrane above is for the separation of one or more gases selected from the group consisting of hydrogen, methane, nitrogen, nitrous oxide, oxygen, carbon monoxide and carbon dioxide.

In another preferred embodiment of the present invention, the gas separation membrane above can be used for the purpose of obtaining high purity methane by eliminating carbon dioxide and moisture from natural gas; eliminating carbon dioxide from by-product gas in steel works and separating and concentrating hydrogen; separating and concentrating carbon dioxide and hydrogen in the course of methane reforming; and separating and concentrating nitrous oxide in the process of preparing adipic acid.

In another preferred embodiment of the present invention, the gas separation membrane above can be a gas separation membrane in which the polyimide material is processed into a membrane in the form of an asymmetric hollow fiber membrane through a phase-change process in the course of dry-jet wet spinning, or in the form of a composite membrane by coating a porous polyether or polypropylene support with it.

In another preferred embodiment of the present invention, the gas separation membrane above has a hydrogen permeation coefficient of at least 10 Barrer or 15 barrer, a carbon dioxide permeation coefficient of at least 2 Barrer or 3 Barrer and an oxygen permeability coefficient of at least 0.7 Barrer.

The gas separation membrane of the present invention can has hydrogen/methane gas selectivity of at least 100 or 180, carbon dioxide/methane gas selectivity of at least 50 or 60, carbon dioxide/carbon monoxide gas selectivity of at least 12 or 15 and oxygen/nitrogen gas selectivity of at least 5 or 7.

The polyimide material prepared according to the present invention has high solubility in casting solvents, particularly in polar organic solvents, by interrupting asymmetry in the polyimide chain structure and formation of polyimide complexes compared with aromatic polyimides, and has higher heat resistance than the conventional aromatic polyimides and aliphatic polyimides, so that it is useful for the process of a high-selective permeable composite membrane or a asymmetric hollow fiber membrane used for commercial purposes, suggesting that it can be effectively used as a membrane for gas separation in various fields. In addition, the polyimide material membrane for gas separation of the present invention is useful because it has superior gas separation properties to the conventional commercialized aromatic polyimides or semi-alicyclic polyimides.

In particular, the gas separation membrane comprising the polyimide material of the present invention has high gas permeability for hydrogen, carbon dioxide and oxygen, and at the same time, has high gas separation selectivity for hydrogen/methane, carbon dioxide/methane, carbon dioxide/carbon monoxide and oxygen/nitrogen, so that it is advantageous for separating and concentrating such gases as methane, hydrogen, oxygen, nitrogen and carbon dioxide efficiently with high purity. Therefore, the polyimide membrane material for gas separation of the present invention can be effectively used for the efficient gas separation in various fields including not only the industry requiring the separation of carbon dioxide, hydrogen, carbon monoxide and methane generated during the process of methane reforming and the processes of manufacturing by-product gas in steel works, IGCC, bio-gas, natural gas and hydrogen, but also the fields of nitrogen separation, oxygen concentration, vapor dehumidification, carbon dioxide separation and other industrial processes using methane, nitrogen, nitrogen dioxide and carbon monoxide, etc.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1: Preparation of BCDA-Based Polyimide (BCDA-MDA)

The alicyclic dianhydride BCDA and the aromatic diamine MDA (4.4'-diaminodiphenyl methane) were loaded in a round glass flask equipped with a mechanical stirrer, a thermometer and a condenser, to which m-cresol was added, followed by dissolving the equivalent molar amount of BCDA and diamine sufficiently in nitrogen atmosphere.

The mixture was stirred at 70~80° C. for 2 hours, followed by further stirring at 200° C. for 18 hours. As a result, a high molecular weight polyimide solution was obtained.

The prepared polyimide solution was diluted in N,N-dimethylformamide (DMF), which was dropped slowly in a beaker containing methanol, followed by precipitation. Then, the mixture was washed with an excessive amount of methanol.

The polyimide powders prepared after washing were vacuum-dried at 60° C. for 12 hours. As a result, polyimide (BCDA-MDA) was obtained (FIG. 1A).

The dried polyimide was dissolved in DMF at the concentration of 10 wt %, followed by casting on a glass plate. The glass plate was dried in a vacuum oven at 60° C. for 24 hours and further dried at 130° C. for 12 hours. As a result, a dense flat membrane having a thickness of 50 microns was prepared.

Example 2: Preparation of BCDA-Based Polyimide (BCDA-6F-m-DA)

A polyimide (BCDA-6F-m-DA) was prepared by the same manner as described in Example 1 except that 6F-m-DA was used instead of MDA.

Example 3: Preparation of BCDA-Based Polyimide (BCDA-m-TDA)

A polyimide (BCDA-m-TDA) was prepared by the same manner as described in Example 1 except that m-TDA was used instead of MDA.

Example 4: Preparation of BCDA-Based Polyimide (BCDA-MDA-6F-m-DA)

A polyimide (BCDA-MDA-6F-m-DA) was prepared by the same manner as described in Example 1 except that two kinds of diamines (MDA and 6F-m-DA) were used instead of MDA.

Example 5: Preparation of BCDA-Based Polyimide (BCDA-MDA-m-TDA)

A polyimide (BCDA-MDA-m-TDA) was prepared by the same manner as described in Example 1 except that two kinds of diamines (MDA and m-TDA) were used instead of MDA.

Example 6: Preparation of BCDA-Based Polyimide (BCDA-6F-m-DA-m-TDA)

A polyimide (BCDA-6F-m-DA-m-TDA) was prepared by the same manner as described in Example 1 except that two kinds of diamines (MDA and m-TDA) were used instead of MDA.

Comparative Example: Preparation of BCDA-ODA Polyimide

A polyimide (BCDA-ODA) was prepared by the same manner as described in Example 1 except that the alicyclic dianhydride BCDA and 4,4'-diaminodiphenyl ether (ODA) were used for the comparative example (J. Polym. Sci. Part B: Polym. Phys. 43 (2005) 2413-2426 and Journal of Membrane Science vol. 349, 25-34, 2010) to the polyimide of the present invention.

FT-IR (Fourier transform infrared spectroscopy) and 1H-NMR (1H-nuclear magnetic resonance spectroscopy) were used in order to confirm the successful synthesis of 6 kinds of polyimides in Example 1-6 and a polyimide in Comparative Example.

FT-IR was performed with Bio-Rad Digilab FTS-165 FT-IR Spectrometer. NMR was performed with Bruker DRX-300 FT-NMR Spectrometer to measure 1H-NMR.

As a result, in the FT-IR spectrum of the prepared polyimide, O—H stretch 3200 cm−1 and N—H stretch 3350 cm−1, the absorption bands of polyamic acid, were not observed but the asymmetric C=O stretch and symmetric C=O stretch peaks were observed at 1780 and 1710 cm−1 and the C—N—C stretching peak was also observed at 1380 cm−1, indicating the successful synthesis of polyimide.

In the 1H-NMR spectrum of polyamic acid, the first condensate of the polyimide reaction, and polyimide after completion, the peaks of 11 ppm (—COOH) and 8 ppm (—NH—) due to polyamic acid disappeared, indicating that the imide ring formation was completed.

As a result, it was confirmed that 6 kinds of polyimides in Examples 1-6 and a polyimide in Comparative Example were successfully synthesized.

Experimental Example 1: Measurement of Intrinsic Viscosity

To measure the intrinsic viscosity of the polyimides of Examples 1-6 and Comparative Example of the present invention and the intrinsic viscosity of the commercial gas separation membrane polymer, each polyimide was dissolved in dimethyl acetamide (DMAc) at the concentration of 0.5 g/dL, followed by measuring the intrinsic viscosity using Cannon-Fenske viscometer at 30° C., and the results are shown in Table 1 below.

TABLE 1

|  | intrinsic viscosity($\eta$int) |
| --- | --- |
| Example 1 | 1.01 dL/g |
| Example 2 | 1.11 dL/g |
| Example 3 | 1.21 dL/g |
| Example 4 | 1.01 dL/g |
| Example 5 | 1.65 dL/g |
| Example 6 | 1.05 dL/g |
| Comparative Example | 1.65 dL/g |

TABLE 1-continued

| | intrinsic viscosity($\eta_{int}$) |
|---|---|
| Polysulfone | 0.49 dL/g |
| Matrimide | 0.62 dL/g |
| Polyethersulfone | 0.39 dL/g |
| P84 | 0.43 dL/g |

From the intrinsic viscosity of the polyimides of Examples 1-6 of the present invention measured above, it was confirmed that polyimide polymers with a very high molecular weight were successfully generated.

Experimental Example 2: Measurement of Solubility

The following experiment was performed to measure the solubility of the polyimides of Examples 1-6 and Comparative Example of the present invention and the solubility of the commercial gas separation membrane polymer in organic solvents.

Particularly, for the experiment, organic solvents listed in Table 2 below were used to prepare 5 wt % polyimide solutions with the polyimides of Examples 1-6 and Comparative Example. The solutions were stirred at room temperature for 24 hours in order to evaluate the solubility. The degree of solubility was sorted as follows. ++: complete dissolution, +: partial dissolution, and −: no dissolution. The results are shown in Table 2 below.

TABLE 2

| | NMP | DMAc | DMF | DMSO | THF | AC | CF | EA | MC | TOL |
|---|---|---|---|---|---|---|---|---|---|---|
| Example 1 | ++ | ++ | ++ | ++ | ++ | + | + | − | ++ | − |
| Example 2 | ++ | ++ | ++ | ++ | ++ | + | + | + | ++ | − |
| Example 3 | ++ | ++ | ++ | ++ | ++ | + | + | + | ++ | − |
| Example 4 | ++ | ++ | ++ | ++ | ++ | + | + | − | ++ | − |
| Example 5 | ++ | ++ | ++ | ++ | ++ | + | + | + | ++ | − |
| Example 6 | ++ | ++ | ++ | ++ | ++ | + | − | − | + | − |
| Comparative Example | ++ | ++ | ++ | ++ | ++ | + | − | − | + | − |
| Polyethersulfone | ++ | ++ | ++ | ++ | − | − | + | − | ++ | − |
| P84 | ++ | ++ | ++ | + | − | − | − | − | + | − |
| polysulfone | ++ | ++ | ++ | − | ++ | − | ++ | − | ++ | − |
| Matrimide | ++ | ++ | ++ | ++ | ++ | − | ++ | − | ++ | − |

As shown in Table 2, the BCDA-based polyimides of Examples 1-6 of the present invention displayed more excellent solubility in organic solvent than the commercial polymer.

The reason of the higher solubility of the BCDA-based polyimide of the present invention in casting solvents, especially in polar organic solvents, than that of the commercial polymer was believed that the BCDA-based polyimide of the present invention was able to intervene asymmetry and formation of polyimide complexes in the polyimide chain structure.

Therefore, the BCDA-based polyimide of the present invention can be processed as a high-selective permeable composite membrane used for commercial purposes or a asymmetric hollow fiber membrane, so that it can be effectively used as a membrane for gas separation in various fields.

Experimental Example 3: Performance Evaluation of Gas Separation Membrane

The performance of a gas separation membrane depends on the perm-selectivity determined by the relative ratio of the permeation rate of a specific gas to the gas separation material and the permeability of the components of the mixture to be separated.

Thus, the gas permeability and selectivity of the BCDA-based polyimide gas separation membrane of the present invention were examined to evaluate the performance of the BCDA-based polyimide gas separation membrane.

The permeability coefficient is a coefficient that normalizes pressure, area, and thickness of a specific sample to show unique permeability of a material, and the unit of the permeability coefficient is represented by barrer.

$$1 \text{ Barrer} = 10^{-10} \times \frac{cc(STP) \times cm}{cm^2 \times s \times cmHg}$$

Pure gas permeability of $CH_4$, $H_2$, $CO$ and $CO_2$ was measured at 25° C. with the pressures of upper 2000 torr and lower 2 torr.

On the other hand, the selectivity is expressed as the ratio of the permeability of the gas to be separated and the unit is dimensionless. In the example below, the selectivity of oxygen/nitrogen is shown.

$$\alpha = \frac{Q(O_2)}{Q(N_2)}$$

The results are shown in Table 3 (gas permeability) and Table 4 (gas selectivity) below.

TABLE 3

| | Permeability (Barrer) | | | | | |
|---|---|---|---|---|---|---|
| | $P_{H2}$ | $P_{CO2}$ | $P_{O2}$ | $P_{CO}$ | $P_{N2}$ | $P_{CH4}$ |
| Example 1 | 20.0 | 6.13 | 1.19 | 0.34 | 0.16 | 0.10 |
| Example 2 | 40.0 | 12.3 | 2.30 | 0.63 | 0.30 | 0.20 |
| Example 3 | 15.30 | 3.41 | 0.80 | 0.11 | 0.12 | 0.04 |
| Example 4 | 20.0 | 6.13 | 0.05 | 0.34 | 0.16 | 0.12 |
| Example 5 | 15.30 | 3.41 | 0.80 | 0.11 | 0.12 | 0.04 |
| Example 6 | 7.98 | 1.48 | 0.51 | 0.18 | 0.16 | 0.052 |
| Comparative Example | 7.98 | 1.48 | 1.10 | 0.14 | 0.32 | 0.20 |
| Matrimide | 27.2 | 7 | 2 | N/A | 0.28 | 0.21 |
| P84 | 9.09 | 1.37 | 0.4 | N/A | 0.05 | 0.03 |
| Polysulfone | 11.8 | 6.3 | 1.4 | N/A | 0.24 | 0.22 |
| Cellulose Acetate | 2.63 | 6.3 | 0.59 | N/A | 0.21 | 0.21 |

TABLE 4

| | Selectivity ($\alpha_{A/B}$) | | | |
|---|---|---|---|---|
| | $P_{H2}/P_{CH4}$ | $P_{CO2}/P_{CH4}$ | $P_{CO2}/P_{CO}$ | $P_{O2}/P_{N2}$ |
| Example 1 | 200 | 61 | 18 | 7 |
| Example 2 | 335 | 74 | 16 | 7 |
| Example 3 | 211 | 71 | 20 | 7 |
| Example 4 | 166 | 51 | 18 | 6 |
| Example 5 | 335 | 74 | 16 | 7 |
| Example 6 | 306 | 57 | 8 | 6 |
| Comparative | 77 | 10 | 10 | 2 |

TABLE 4-continued

| | Selectivity ($\alpha_{A/B}$) | | | |
|---|---|---|---|---|
| | $P_{H2}/P_{CH4}$ | $P_{CO2}/P_{CH4}$ | $P_{CO2}/P_{CO}$ | $P_{O2}/P_{N2}$ |
| Example | | | | |
| Matrimide | 129 | 33 | N/A | 7 |
| P84 | 325 | 49 | N/A | 8 |
| Polysulfone | 54 | 29 | N/A | 6 |
| Cellulose Acetate | 13 | 30 | N/A | 3 |

As shown in Table 3 and Table 4, the BCDA-based polyimide gas separation membrane of the present invention has high gas permeability for hydrogen, carbon dioxide and oxygen, and at the same time, has high gas separation selectivity for hydrogen/methane, carbon dioxide/methane, carbon dioxide/carbon monoxide and oxygen/nitrogen.

Thus, the BCDA-based polyimide gas separation membrane of the present invention is advantageous for separating and concentrating such gases as methane, hydrogen, oxygen, nitrogen and carbon dioxide efficiently with high purity. Therefore, the polyimide membrane material for gas separation of the present invention can be effectively used for the efficient gas separation in various fields including not only the industry requiring the separation of carbon dioxide, hydrogen, carbon monoxide and methane generated during the process of methane reforming and the processes of manufacturing by-product gas in steel works, IGCC, biogas, natural gas and hydrogen, but also the fields of nitrogen separation, oxygen concentration, vapor dehumidification, carbon dioxide separation and other industrial processes using methane, nitrogen, nitrogen dioxide and carbon monoxide, etc.

What is claimed is:

1. A homo- or co-polyimide material comprising a compound of Formula 1':

[Formula 1']

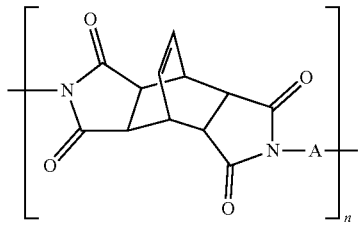

wherein is at least one compound selected from the group consisting of

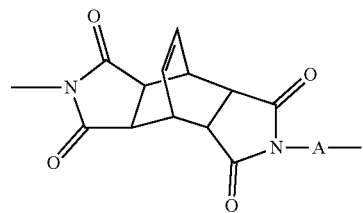

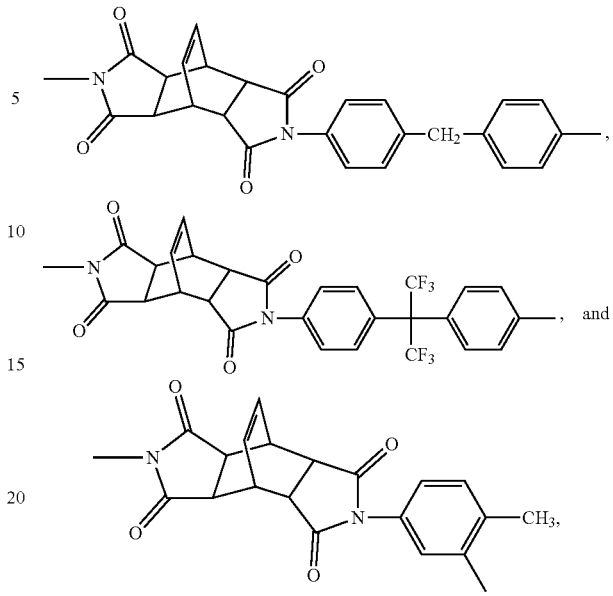

wherein n is greater than or equal to 10.

2. The homo- or co-polyimide material according to claim 1, wherein the homo- or co-polyimide material has an intrinsic viscosity ($\eta_{int}$) of 0.9-1.7 dL/g.

3. The homo- or co-polyimide material according to claim 1, wherein the homo- or co-polyimide material is soluble in N-methyl-2-pyrrolidone (NMP), dimethylacetamide (DMAc), dimethylformamide (DMF), dimethylsulfoxide (DMSO), tetrahydrofuran (THF), acetone (AC), chloroform (CF), diethylacetate, y-butyrolactone, or a mixed solvent thereof.

4. A gas separation membrane comprising the homo- or co-polyimide material of claim 1.

5. The gas separation membrane according to claim 4, wherein the gas separation membrane is for the separation of one or more gases selected from the group consisting of hydrogen, methane, nitrogen, nitrous oxide, oxygen, carbon monoxide and carbon dioxide.

6. The gas separation membrane according to claim 4, wherein the gas separation membrane is used for the purpose of obtaining high purity methane by eliminating carbon dioxide and moisture from natural gas; eliminating carbon dioxide from by-product gas in steel works and separating and concentrating hydrogen; separating and concentrating carbon dioxide and hydrogen in the course of methane reforming; and separating and concentrating nitrous oxide in the process of preparing adipic acid.

7. The gas separation membrane according to claim 4, wherein the gas separation membrane is a gas separation membrane in which the homo- or co-polyimide material of claim 5 is processed into a membrane in the form of an asymmetric hollow fiber membrane through a phase-change process in the course of dry-jet wet spinning, or in the form of a composite membrane by coating a porous polyether or polypropylene support with the homo- or co-polyimide material.

8. A method for separating one or more gas from mixed gas using the gas separation membrane of claim 4.

9. The method according to claim 8, wherein the mixed gas is a mixture of one or more gas selected from the group consisting of $H_2$, CO, $CO_2$, $CH_4$, $N_2$, $N_2O$ and $O_2$.

10. The method according to claim 8, wherein the separated gas is $H_2$ if the mixed gas comprises $H_2/CH_4$;
   wherein the separated gas is $CO_2$ if the mixed gas comprises $CO_2/CH_4$ or $CO_2/CO$; or
   wherein the separated gas is $O_2$ if the mixed gas comprises $O_2/N_2$.

\* \* \* \* \*